United States Patent [19]

Bauder et al.

[11] 4,338,898
[45] Jul. 13, 1982

[54] APPARATUS FOR DISTRIBUTION OF FUEL FROM AN INJECTION NOZZLE WITH RESPECT TO A PISTON IN AN AIR COMPRESSING INTERNAL COMBUSTION ENGINE WITH DIRECT FUEL INJECTION

[75] Inventors: Richard Bauder, Neckarsulm; Peter Will, Neuenstadt, both of Fed. Rep. of Germany

[73] Assignee: Audi Nsu Auto Union Aktiengesellschaft, Neckarsulm, Fed. Rep. of Germany

[21] Appl. No.: 932,651

[22] Filed: Aug. 10, 1978

[30] Foreign Application Priority Data

Aug. 27, 1977 [DE] Fed. Rep. of Germany ....... 2738687

[51] Int. Cl.³ .............................................. F02B 3/00
[52] U.S. Cl. .................. 123/279; 123/193 P; 123/193 CP; 123/294; 123/283
[58] Field of Search .............. 123/32 C, 32 F, 32 B, 123/30 C, 30 B, 33 M, 32 ST, 191 R, 193 P, 193 CP, 65 WA

[56] References Cited

U.S. PATENT DOCUMENTS

| | | | |
|---|---|---|---|
| 1,498,273 | 6/1924 | Hesselman | 123/30 B |
| 2,125,293 | 8/1938 | Hesselman | 123/32 F |
| 2,290,212 | 7/1942 | Schweitzer | 123/65 WA |
| 2,292,409 | 8/1942 | Steward | 123/32 C |
| 2,803,229 | 8/1957 | Schwaiger | 123/32 F |
| 3,872,841 | 3/1975 | Kimbara et al. | 123/32 ST |

FOREIGN PATENT DOCUMENTS

| | | | |
|---|---|---|---|
| 1526290 | 4/1970 | Fed. Rep. of Germany | 123/32 SP |
| 525067 | 8/1940 | United Kingdom | 123/32 SP |

Primary Examiner—P. S. Lall
Attorney, Agent, or Firm—Kane, Dalsimer, Kane, Sullivan & Kurucz

[57] ABSTRACT

In an air compressing, internal combustion engine with direct fuel injection, a rotation-symmetrical combustion chamber is positioned in a piston. Combustion air circulates around the longitudinal axis of the combustion chamber at the moment of fuel injection. An injection nozzle is provided from which the fuel is injected in at least two fuel jets into the combustion chamber. The engagement points of the fuel jets on the circumferential wall of the combustion chamber are evenly distributed over said wall. In addition, the engagement points are in different planes disposed normal to the longitudinal axis of the combustion chamber while being spaced from each end thereof. In one embodiment, the injection nozzle is coaxially disposed and emits three fuel jets, the engagement points of which are located in different planes evenly spaced from one another. In another embodiment the injection nozzle is offset with respect to the axis of the combustion chamber with the fuel jets being of substantially equal length. In a further embodiment, at least four fuel jets are emitted from a coaxially disposed injection nozzle with the engagement points of oppositely arranged pairs of fuel jets being in the same plane.

1 Claim, 6 Drawing Figures

APPARATUS FOR DISTRIBUTION OF FUEL FROM AN INJECTION NOZZLE WITH RESPECT TO A PISTON IN AN AIR COMPRESSING INTERNAL COMBUSTION ENGINE WITH DIRECT FUEL INJECTION

BACKGROUND OF THE INVENTION

1. Field of the Invention

The invention relates to an air compressing internal combustion engine with direct fuel injection comprising a reciprocating piston with a rotation-symmetric combustion chamber. The air of combustion circulates around the longitudinal axis of the combustion chamber at the moment of injection; and the fuel is injected into the combustion chamber in form of at least two fuel jets by an injection nozzle.

2. Description of the Prior Art

In a known internal combustion engine (Swiss Pat. No. 368,016) fuel is injected into the combustion chamber in the direction of air flow with at least two fuel jets of different lengths. The shorter fuel jet ignites at the edge of the combustion chamber and the longer fuel jet or jets are ignited by the ignition flame of the shorter fuel jet. This results in a slow and knock free burning of the fuel mixture which permits construction of flat combustion chambers and light weight pistons. In such an embodiment, wherein the fuel jets are injected in the direction of the air flow into the combustion chamber, it is unavoidable that the fuel jets are in close proximity with one another. This is disadvantageous because the cones of the fuel jets interfere with each other or are forced into each other by the air flow, which results in spotty and undesirable fuel concentration, higher fuel consumption and pronounced soot development. Furthermore, incomplete burning of the fuel takes place which disadvantageously influences the quality of exhaust gases.

SUMMARY OF THE INVENTION

It is therefore an object of the invention to provide a combustion engine of the foregoing type wherein the aforenoted disadvantages are eliminated and the fuel jets are fed into the combustion chamber without interfering with each other.

The object of the invention is achieved by evenly distributing the engagement points of the fuel jets on the circumferential wall of the combustion chamber. At the same time, the engagement points are positioned in different planes perpendicular to the longitudinal axis of the combustion chamber and at a distance from the piston head and the bottom of the combustion chamber.

This arrangement of the engagement points in the combustion chamber assures that these points are removed from one another as far as possible so that it is virtually impossible to have interference of the jet cones of the fuel jets and consequently even distribution in the combustion chamber is obtained. The distance of the engagement points from each other permits a stronger angular momentum or swirl for the combustion air which is fed into the combustion chamber. Consequently, a particularly intensive mixing of fuel and air is obtained which results in improved fuel consumption and lower soot generation, as well as a quicker ignition, so that substantially smaller amounts of harmful agents are emitted with the exhaust gas.

In an internal combustion engine wherein the fuel is injected with an injection nozzle in form of at least three fuel jets into the combustion chamber, an even distribution of the injected fuel is obtained, if the engagement points are positioned in evenly spaced planes. The injection nozzle can be offset with respect to the longitudinal axis of the combustion chamber in such a way that the fuel jets have the same length. In this embodiment, the fuel jets engage the combustion wall simultaneously with a substantial free jet length to provide a corresponding even distribution and a particularly good mixture formation.

In an internal combustion engine with an injection nozzle, wherein the fuel is injected into the combustion chamber with an even number of at least four fuel jets, the aforementioned advantages may be obtained with the engagement points of oppositely directed fuel jets positioned in a common plane.

Further details and features of the invention will be described in the following description taken in conjunction with the drawings.

DETAILED DESCRIPTION

Figure 1:
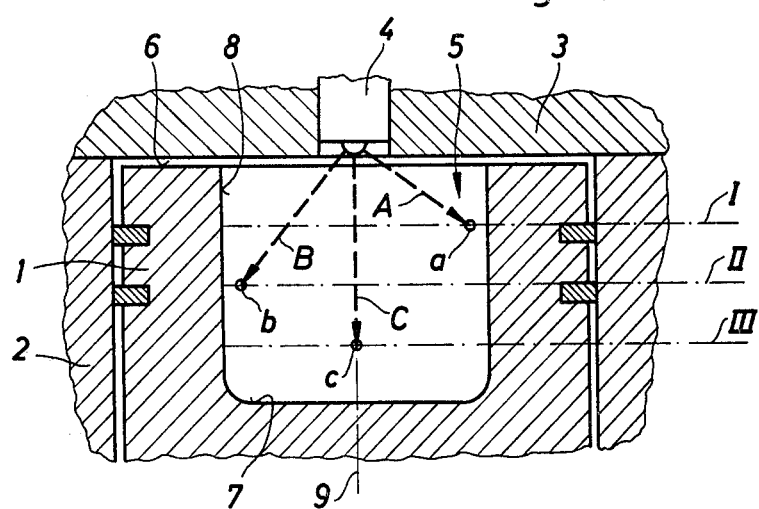
FIG. 1 is a schematic and fragmentary longitudinal sectional view through the upper portion of a piston arranged in a cylinder with fuel jets symmetrically directed into the rotation-symmetrical combustion chamber.

Referring initially to FIG. 1, an air compressing, internal combustion engine with direct fuel injection includes a cylinder 2 and a cylinder head 3, provided with a fuel injection nozzle 4. A piston 1 is positioned in cylinder 2 for reciprocating movement and is shown in FIG. 1 in the upper deadcenter position. The piston is provided with a rotation-symmetric combustion chamber 5 which extends from the piston head 6 and is limited by bottom 7 and the circumferential wall 8. The injection nozzle 4 is concentrically positioned with respect to the longitudinal axis 9 of the combustion chamber 5 and directs three fuel jets into the combustion chamber 5 wherein the combustion air circulates around the longitudinal axis 9. This circular movement of the combustion air is generated by means (not shown) well known in the art, f.i. by a baffle on the inlet valve or a helical inlet port (e. g. U.S. Pat. No. 3,945,363). The fuel jets in this embodiment are indicated by dotted arrows A, B, and C. The engagement points a, b and c of fuel jets A, B, and C are positioned in different planes, I, II and III perpendicular with respect to the longitudinal axis 9. These planes are equi-distant from each other and from piston head 6 and from bottom 7.

Figure 2:
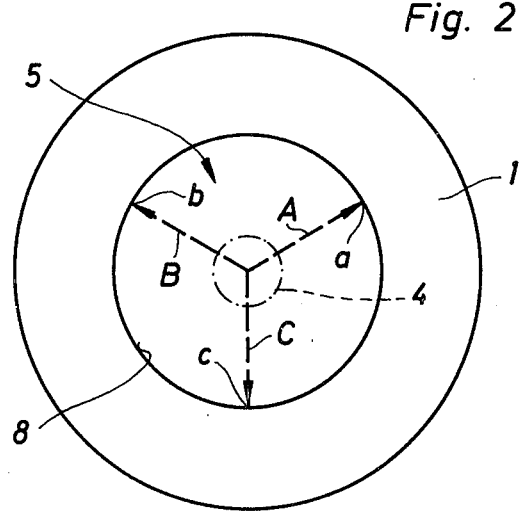
FIG. 2 is a plan view of the combustion chamber of the piston shown in FIG. 1.

As can be seen from FIG. 2, the engagement points a, b and c of fuel jets A, B and C are evenly distributed over the circumferential wall 8 of the combustion chamber 6. As a result of this distribution of engagement points a, b and c and their disposition in the different planes I, II and III, an even distribution of the injection fuel within the combustion chamber is assured. Any interference of the fuel cones which surround the fuel jets A, B and C as well as possible interference caused by eddy air currents is eliminated.

Figure 3:
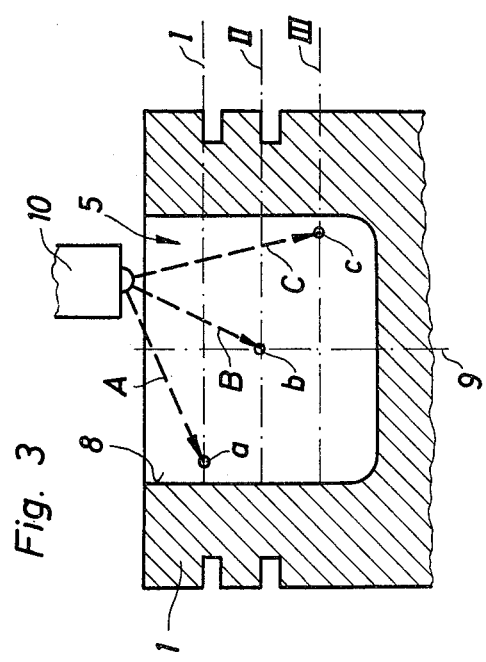
FIG. 3 is a longitudinal sectional view through a part of the piston similar to FIG. 1, wherein the injection nozzle is offset from the longitudinal axis of the combustion chamber.

In the embodiment shown in FIG. 3, the injection nozzle 10 is offset with respect to the longitudinal axis 9 of the combustion chamber 5 in such a way that the fuel jets A, B and C are of equal length. Therefore, these jets engage the circumferential wall 8 of the combustion chamber simultaneously at the respective engagement points a, b and c, which are also positioned in different planes I, II and III.

Figure 4:
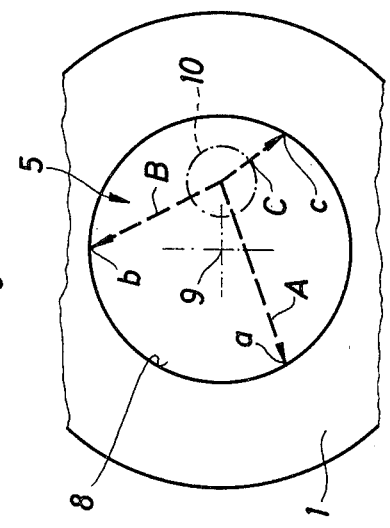
FIG. 4 is a plan view of the combustion chamber of the piston of FIG. 3.

From FIG. 4 it can be seen that the engagement points a, b and c of fuel jets A, B and C are also evenly distributed over the circumference of circumferential wall 8, although the injection nozzle 10 is in an offset position. Also in this case, an even distribution of the injected fuel is obtained in combustion chamber 5; and any interference of the fuel cones which encompass the fuel jets A, B and C is eliminated even at strong turbulence of the combustion air.

Figure 5:
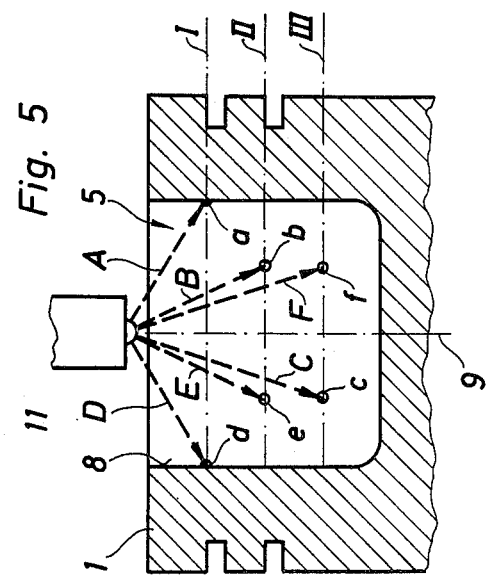
FIG. 5 is a longitudinal sectional view similar to FIG. 3, showing a further embodiment of the invention.

The embodiment shown in FIG. 5 shows an injection nozzle 11 positioned concentrically with respect to the longitudinal axis 9 of the combustion chamber 5 and from which the fuel is injected into the combustion chamber 5 by, for example, six fuel jets A, B, C, D, E and F. In order to obtain an even distribution of the fuel in the combustion chamber 5 in this embodiment, and to eliminate any interference of the fuel cones which encompass the fuel jets, even at strong air turbulence, engagement points a, b, c, d, e and f of the oppositely arranged fuel jets A-D are positioned in plane I, B-E in plane II and C-F in plane III.

Figure 6:
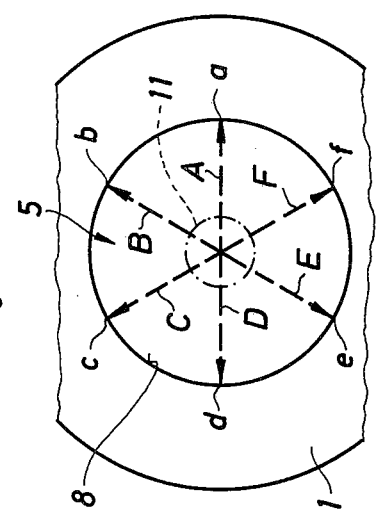
FIG. 6 is a plan view of the combustion chamber of FIG. 5.

As shown in FIG. 6 the engagement points a, b, c d, e and f are also evenly distributed over circumferential wall 8 of the combustion chamber 5. In this embodiment, the fuel jets which are positioned at one plane are farthest removed from each other.

The invention is not limited to the illustrated embodiments. For example, any other given number of planes containing one or more engagement points and fuel jets may be used.

The invention is useful in both compression-ignition engines and gasoline engines with direct fuel injection.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. In an air compressing internal combustion engine with direct fuel injection, comprising a cylinder with a cylinder head, a reciprocating piston in said cylinder, said piston having a rotation-symmetrical combustion chamber having a longitudinal axis and comprising an essentially cylindrical circumferential wall and a bottom wall perpendicular to said axis, in which the combustion air circulates around said axis at the moment of fuel injection, and an injection nozzle in said cylinder head from which the fuel is injected in at least two fuel jets into the combustion chamber, the improvement of means for distributing the points where the fuel jets hit the circumferential wall evenly over said wall and locating said points in different planes disposed perpendicular with respect to said axis and spaced from the open end and the bottom wall of the combustion chamber, and said nozzle being offset from said axis in such manner that the fuel jets are of substantially equal length.

* * * * *